United States Patent
Gao et al.

(10) Patent No.: US 9,514,079 B2
(45) Date of Patent: Dec. 6, 2016

(54) USING ADAPTIVE CHANNEL SELECTION TO ENHANCE THE PERFORMANCE OF WIRELESS DOCKING

(71) Applicant: Intel Corporation, Santa Clara, CA (US)

(72) Inventors: Jie Gao, Sunnyvale, CA (US); Ulun Karacaoglu, San Diego, CA (US); Lei Shao, Sunnyvale, CA (US); Xintian E. Lin, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 840 days.

(21) Appl. No.: 13/631,473

(22) Filed: Sep. 28, 2012

(65) Prior Publication Data

US 2014/0095755 A1    Apr. 3, 2014

(51) Int. Cl.

| | |
|---|---|
| *G06F 13/00* | (2006.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |

(Continued)

(52) U.S. Cl.
CPC .......... *G06F 13/387* (2013.01); *G06F 1/1632* (2013.01); *H04W 72/02* (2013.01); *H04W 72/08* (2013.01)

(58) Field of Classification Search
CPC ...... G06F 1/1632; G06F 1/1698; H04H 20/61; H04W 4/008

USPC ................. 710/303; 370/252, 329; 455/41.2
See application file for complete search history.

(56) References Cited

U.S. PATENT DOCUMENTS 5,657,317 A * 8/1997 Mahany et al. ............... 370/338
6,760,882 B1 * 7/2004 Catreux ............... H04L 1/0016
                                                                370/252

(Continued)

FOREIGN PATENT DOCUMENTS

EP          2194438 A1    6/2010
WO    WO-2007103720 A2   9/2007

(Continued)

OTHER PUBLICATIONS

"International Application Serial No. PCT/US2013/044725, International Search Report mailed Oct. 7, 2013", 4 pgs.

(Continued)

*Primary Examiner* — Faisal M Zaman
(74) *Attorney, Agent, or Firm* — Schwegman Lundberg & Woessner, P.A.

(57) ABSTRACT

An Adaptive Channel Selection (ACS) system is disclosed. A computing device uses wireless docking to provide a separate monitor and full-size input devices. The computing device requests docking, receives data wirelessly from the full-size input devices, and provides compressed video display data wirelessly for display on the separate monitor. An adaptive docking adapter receives and decodes compressed video display data and provides the decoded compressed video display data to a separate monitor for display. A wireless connection is disposed between the computing device and the adaptive docking adapter to provide wireless transmission of signals between the computing device and the adaptive docking adapter.

24 Claims, 7 Drawing Sheets

(51) Int. Cl.
*H04L 12/26* (2006.01)
*H04W 4/00* (2009.01)
*H04B 7/00* (2006.01)
*G06F 13/38* (2006.01)
*G06F 1/16* (2006.01)
*H04W 72/02* (2009.01)
*H04W 72/08* (2009.01)

(56) References Cited

U.S. PATENT DOCUMENTS

| | | | |
|---|---|---|---|
| 7,545,867 B1* | 6/2009 | Lou et al. | 375/259 |
| 8,059,740 B2* | 11/2011 | Hansen | H04L 1/0057 375/261 |
| 8,254,992 B1* | 8/2012 | Ashenbrenner et al. | 455/557 |
| 2006/0181982 A1* | 8/2006 | Villevieille et al. | 369/47.1 |
| 2008/0159210 A1* | 7/2008 | Zaks et al. | 370/329 |
| 2009/0066704 A1* | 3/2009 | Daniel et al. | 345/501 |
| 2009/0247082 A1* | 10/2009 | Sathath et al. | 455/41.2 |
| 2010/0077109 A1* | 3/2010 | Yan et al. | 710/17 |
| 2011/0150235 A1 | 6/2011 | Igoe | |
| 2011/0170511 A1* | 7/2011 | Chen | 370/329 |
| 2011/0188391 A1* | 8/2011 | Sella et al. | 370/252 |
| 2012/0052900 A1* | 3/2012 | Liu | H04W 28/0205 455/515 |
| 2012/0057534 A1* | 3/2012 | Park | H04W 72/082 370/329 |
| 2012/0077534 A1* | 3/2012 | Matsuo | H04W 76/043 455/509 |
| 2012/0099566 A1* | 4/2012 | Laine et al. | 370/338 |
| 2012/0120892 A1* | 5/2012 | Freda et al. | 370/329 |
| 2012/0265913 A1* | 10/2012 | Suumaki et al. | 710/303 |
| 2012/0314673 A1* | 12/2012 | Noh et al. | 370/329 |
| 2013/0028309 A1* | 1/2013 | Park | H04L 1/0015 375/227 |
| 2013/0035128 A1* | 2/2013 | Chan | H04W 72/085 455/513 |
| 2013/0089026 A1* | 4/2013 | Piper | H04R 5/04 370/328 |
| 2013/0142035 A1* | 6/2013 | Sunderrajan | 370/225 |
| 2013/0252548 A1* | 9/2013 | Levy et al. | 455/41.2 |
| 2014/0050156 A1* | 2/2014 | Chan | H04W 76/025 370/329 |
| 2015/0016417 A1* | 1/2015 | Dees et al. | 370/331 |

FOREIGN PATENT DOCUMENTS

| | | |
|---|---|---|
| WO | WO-2007127413 A2 | 11/2007 |
| WO | WO-2014051716 A1 | 4/2014 |

OTHER PUBLICATIONS

"International Application Serial No. PCT/US2013/044725, Written Opinion mailed Oct. 7, 2013", 7 pgs.

"Part 11: Wireless LAN Medium Access Control (MAC) and Physical Layer (PHY) Specifications", IEEE Std 802.11. Local and metropolitan area networks. IEEE Standards Association. IEEE Computer Society., (Mar. 29, 2012), 2973 pgs.

"Part 11: Wireless LAN Medium Access Control (MAC) and Physical Layer (PHY) Specifications: Amendment 5: Enhancements for Higher Throughput", IEEE Std. 802.11n. Local and metropolitan area networks. IEEE Computer Society., (Oct. 29, 2009), 536 pgs.

"Part 11: Wireless LAN Medium Access Control (MAC) and Physical Layer (PHY) Specifications: Amendment 4: Enhancements for Very High Throughput for Operation in Bands below 6 GHz", IEEE Std 802.11ac. Local and metropolitan area networks. IEEE Computer Society., (2013), 425 pgs.

"International Application Serial No. PCT/US2013/044725, International Preliminary Report on Patentability mailed Apr. 9, 2015", 9 pgs.

* cited by examiner

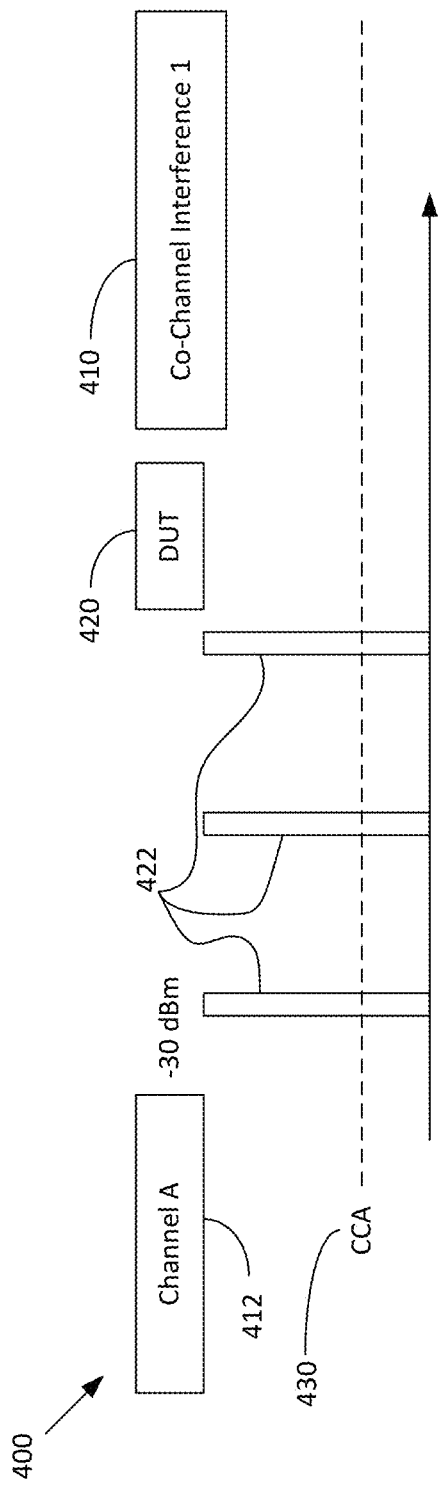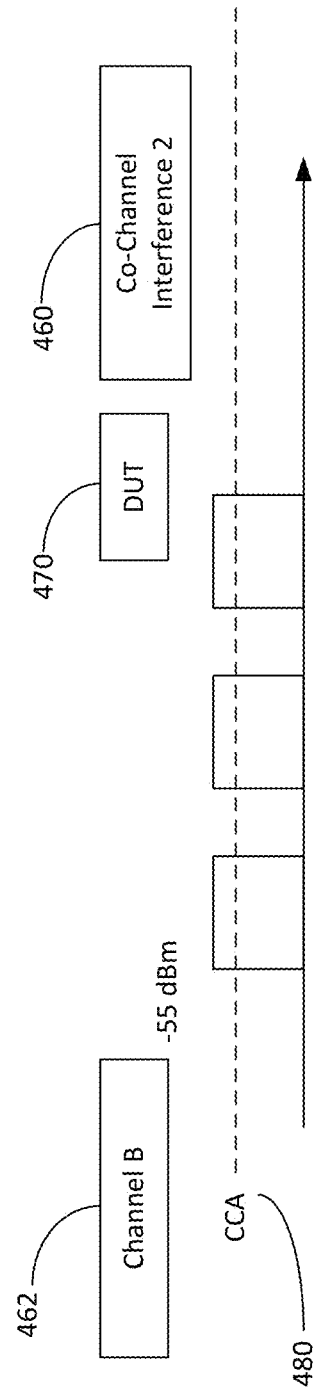

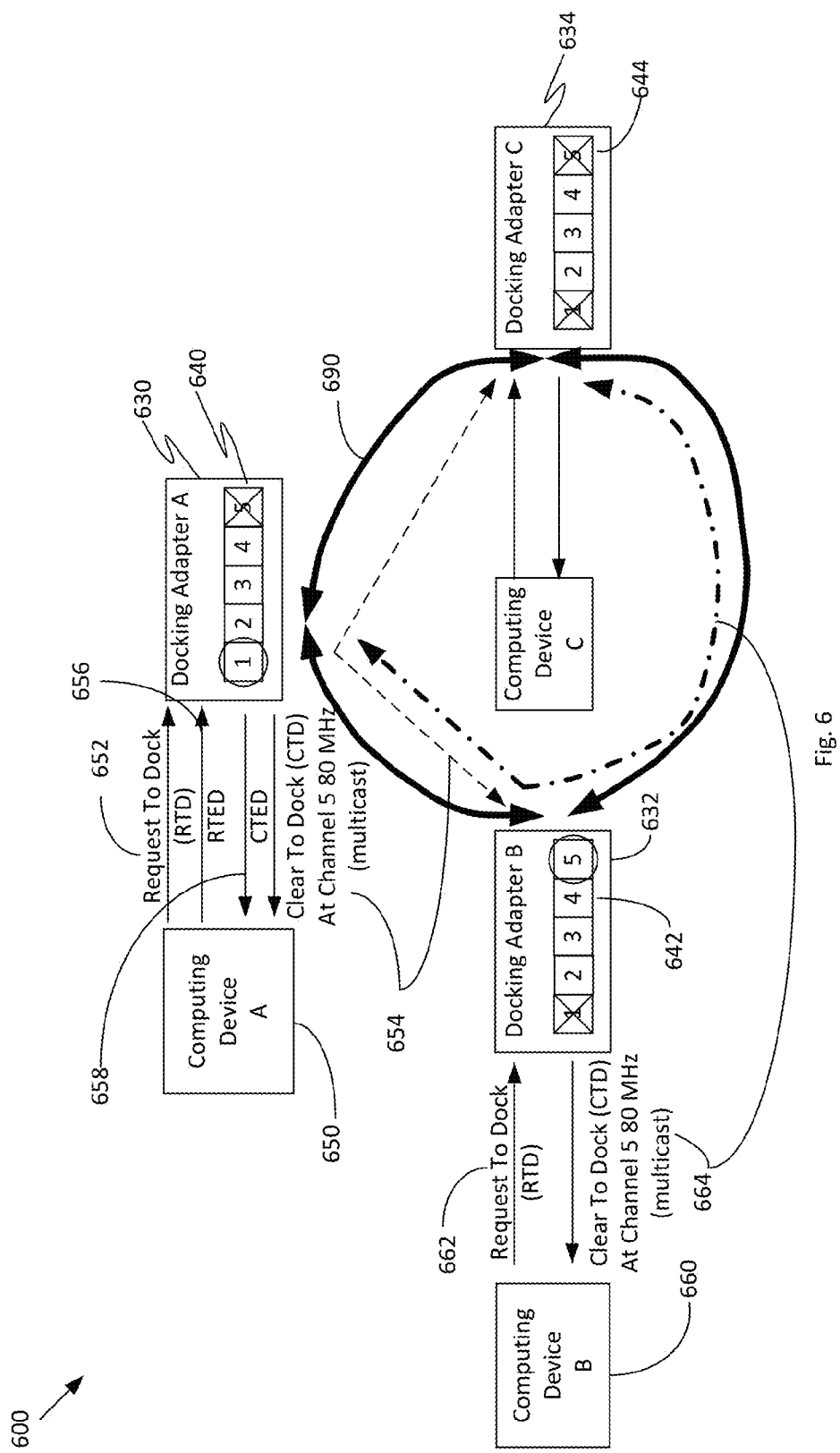

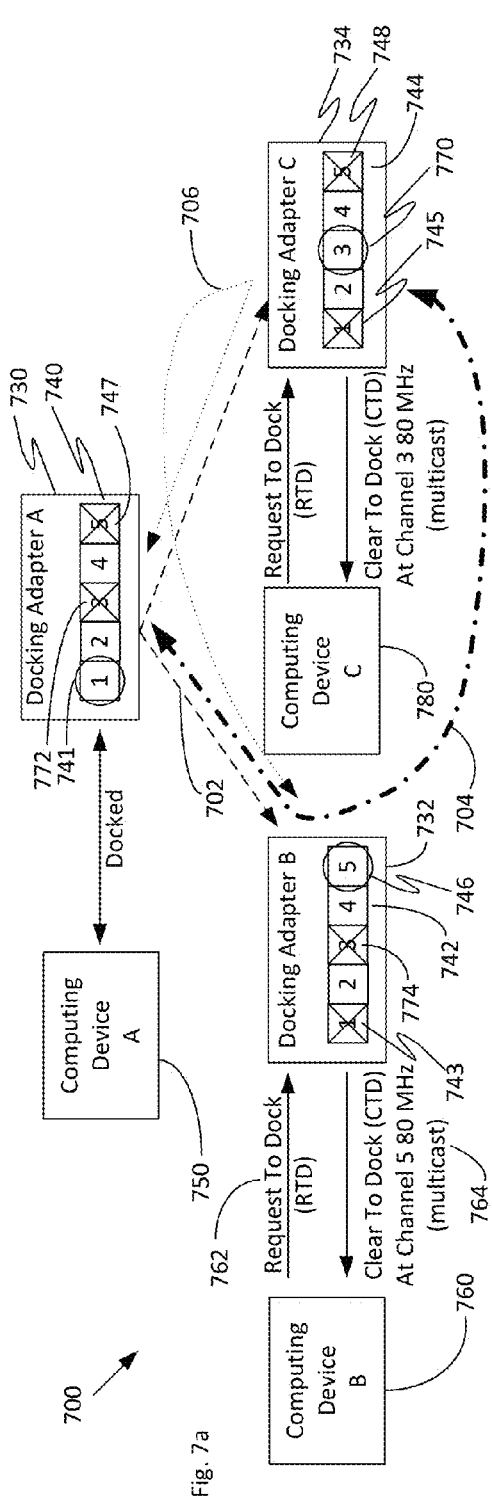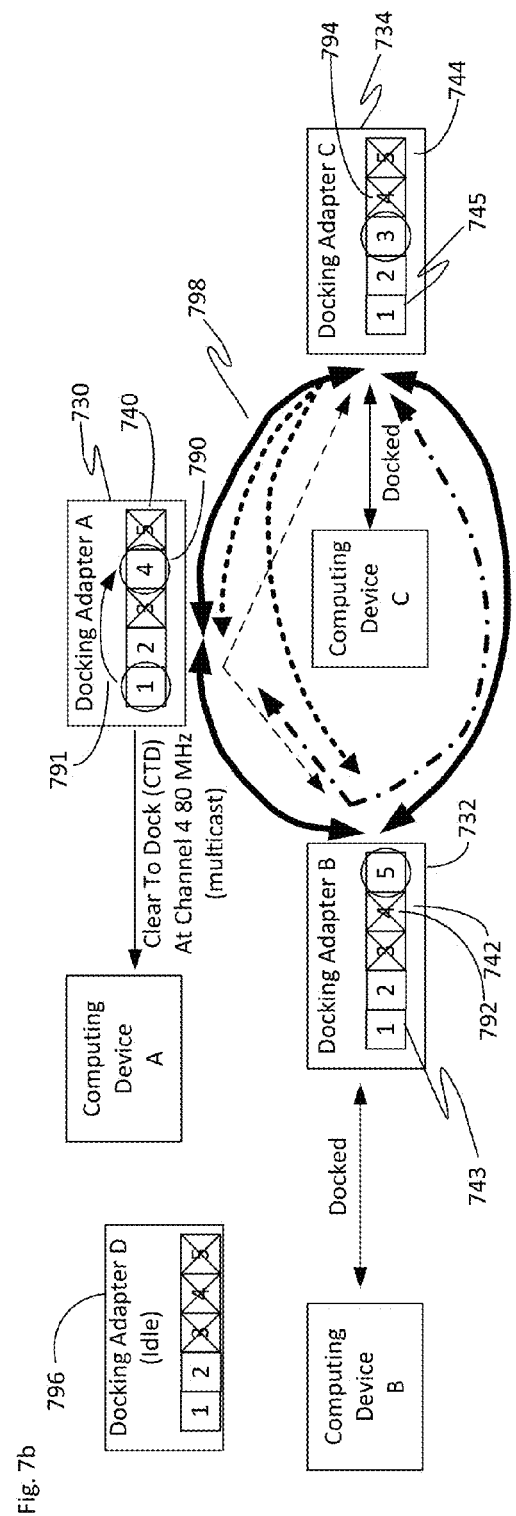

USING ADAPTIVE CHANNEL SELECTION TO ENHANCE THE PERFORMANCE OF WIRELESS DOCKING

BACKGROUND

Wireless docking is a technique that uses wireless technology (e.g., the Institute of Electrical and Electronics Engineers (IEEE) 802.11n standard, IEEE 802.11 ac standard, etc.) to dock a computing device without the need of physically connecting to a docking station. After establishing the wireless docking connection, the user is able to use an external mouse, an ergonomic keyboard, and a distinct monitor (which is usually larger than the display of the computing device).

To provide wireless docking, the display of a computing device is encoded and wirelessly sent to a docking adapter through a wireless connection (e.g., Wi-Fi®). The docking adapter receives compressed display data (e.g., Wi-Fi® packets), decodes the compressed display data, and sends the decoded display data to the distinct monitor. Universal Serial Bus (USB) over Internet Protocol (IP) packets (i.e., USB data from keyboard and mouse) may be sent back to the computing device using the wireless connection.

To preserve a high quality of text during docking usage, a higher encoder rate is desired, and thus a higher throughput on the wireless connection is needed (e.g., 30 Mbps). The IEEE 802.11n standard provides approximately a 150 Mbps physical rate using a 2×2 multiple-input multiple-output (MIMO) wireless communication and a 20 MHz channel. The actual total channel throughput is approximately 80 Mbps. Using a wider, 40 MHz channel doubles the system throughput. When wireless docking is deployed in a dense office environment, 20 or 30 concurrent docking users may need to be accommodated, and thus capacity becomes the major concern.

Wi-Fi® uses non-licensed spectrum including 2.4 GHz and 5 GHz bands. A traditional 2.4 GHz band has three non-overlapping 20 MHz channels and thus has to share the channel with many consumer products (i.e., Bluetooth, microwave, etc.). The 5 GHz band has a wider bandwidth (e.g., 22 non-overlapping 20 MHz channels in the US.). In addition, technology that uses the nearly completed IEEE 802.11ac standard will debut soon. The IEEE 802.11ac standard may be implemented to provide an 867 Mbps physical rate when a 2×2 MIMO and an 80 MHz channel are used. The IEEE 802.11ac standard also supports a more efficient modulation scheme and may bond wider channel bandwidth, up to 160 MHz, to improve link speed. However, the wider bandwidth increases susceptibility to co-channel and adjacent channel interference.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 4*a-b* illustrate a Device Under Test DUT) with co-channel interference based on average power;

FIG. 6 illustrates a system diagram Adaptive Channel Selection, according to another embodiment; and FIGS. 7*a-b* illustrate an adaptive channel switch during an existing dock session based on available docking channel information, according to an embodiment.

DETAILED DESCRIPTION

According to an embodiment, adaptive channel selection involves a docking adapter that measures the channel load instead of average energy to calculate the available bandwidth per channel. The idle docking adapter may also be used for channel load scanning and wirelessly communicating the optimum channel for the existing docking adapter systems in proximity range for performing an adaptive channel switch. An idle docking adapter may intelligently distribute the wireless docking traffic information and efficiently utilize the available channel capacity.

Figure 1:
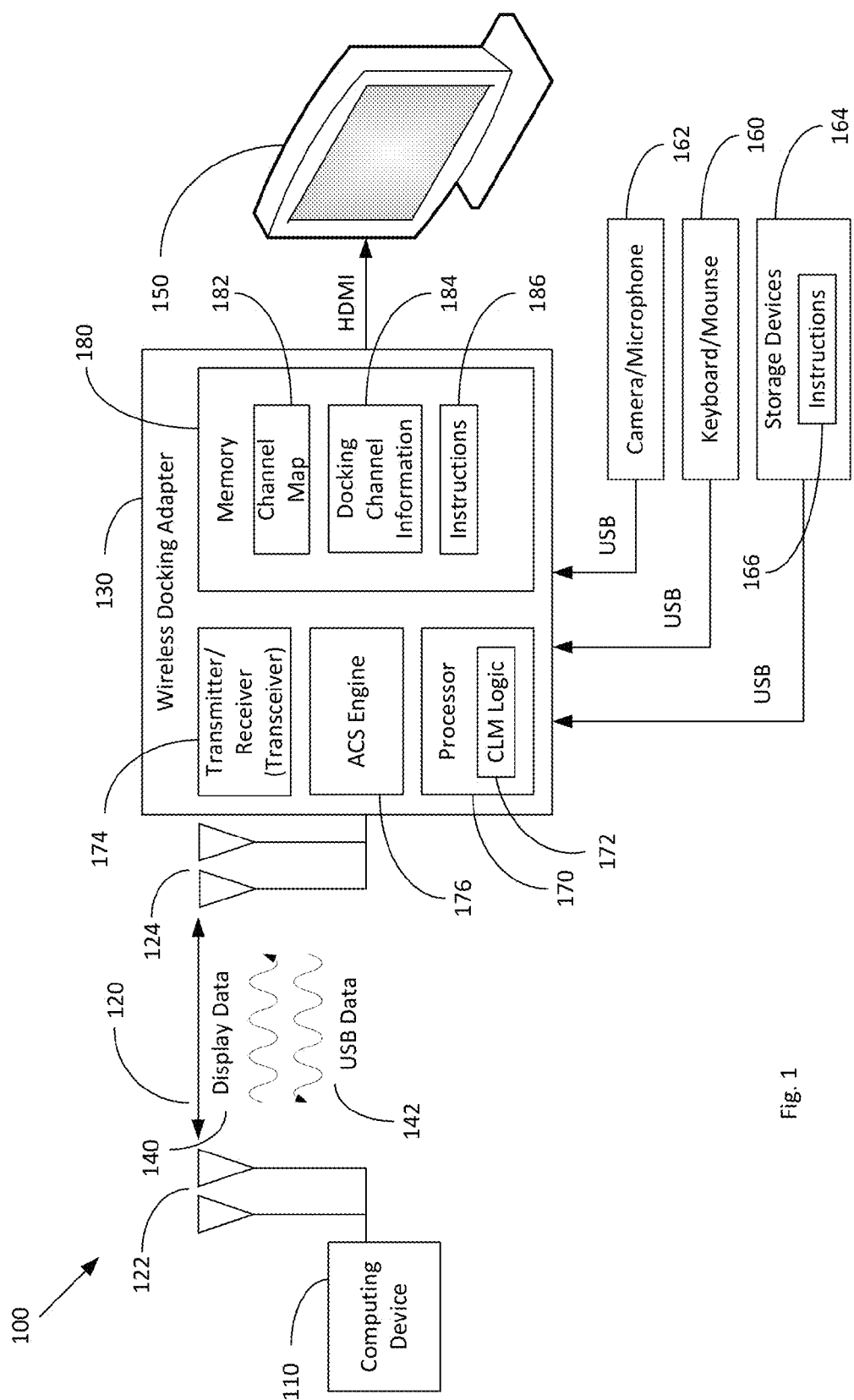
FIG. 1 illustrates a block diagram of a wireless docking adapter system, according to an embodiment.

FIG. 1 illustrates a block diagram of an Adaptive Channel Selection (ACS) adapter 100 according to an embodiment. The display of the computing device 110 is encoded and wirelessly sent to a docking adapter through a wireless connection 120, e.g., Wi-Fi®. The docking adapter 130 receives compressed display data, e.g., Wi-Fi® packets, decodes the compressed display data 140, and sends the decoded display data to the distinct monitor/display 150. USB over IP packets 142, i.e., USB data from keyboard and mouse 160, may be wirelessly sent back to the computing device 110 via the wireless connection 120. Other devices may also send data to the computing device 110 via USB data 142. For example, a camera and microphone 162 may be coupled to the wireless docking adapter 130. The wireless connection may be accomplished using multiple antennas 122, 124 on the computing device 110 and the wireless adapter 130, respectively. For example, the multiple antennas 122, 124 may be used to support MIMO and other smart antenna or sensor technologies.

Wireless docking adapter 130 includes a processor 170, memory 180, a transmitter/receiver (transceiver) 174 and an ACS engine 176. The transceiver 174 transmits and receives wireless signals for the docking adapter 130. The processor 170 includes a Channel Load Measurement (CLM) logic module 172. The CLM logic module 172 performs channel load measurements to calculate the available bandwidth per channel. The ACS engine 176 periodically monitors all available wireless channel and channel load measurements, decodes broadcast packets received from other adaptive docking adapters, determines channel load measurements for various channel configurations, determines a channel having a highest expected throughput, selects an optimum wireless configuration and channel having the determined highest expected throughput as a current channel, identifies a station identifier (ID) and a channel number for use in establishing a docking session, and stores the selected optimum wireless configuration and channel determined to have the highest expected throughput according to a predetermined schedule. The ACS engine 176 uses the stored selected optimum wireless configuration and channel determined to have the highest expected throughput for wireless docking when a docking request is received. The ACS engine 176 also counts and adds the number of docking pairs, differentiated by station IDs, used in each channel and updates the channel map according to a predetermined schedule.

Memory 180 may include a channel map 182 for providing an indication of the status of channels in the ACS adapter 100. The memory 180 may also include other docking channel information 184. Additional memory, such as mass storage devices 164, may be coupled to the docking adapter 130 to provide additional storage. For example, mass storage device 164 may be a USB device that is directly connected to the wireless docking adapter 130. After computing device 110 is docked with wireless docking adapter 130, storage device 164 may be configured for the user of the computing device 110 to remotely and wirelessly send and/or receive data between the computing device 110 and the storage device 164 through, for example, USB over IP packets. Storage device 164 may also use other types of communication buses to connect the mass storage device 164 to the wireless adapter 130 for wireless data transfer between the mass storage device 164 and the computing device 110. The ACS engine 176 broadcasts to other adaptive docking adapters in range according to a predetermined schedule so that ACS adapters 100 are aware of wireless connections 120 being used by other ACS wireless adapters within range and can update their channel map 182 upon detection of any change.

Memory devices 164, 180 may have stored one or more sets of data structures or instructions 166, 186 (e.g., software) embodying or utilized by any one or more of the techniques or functions described herein. The instructions 166, 186 may also reside, completely or at least partially, within the memory devices 164, 180, or within the processor 170 during execution thereof by the processor 170. In an example, one or any combination of the processor 170 and the memory devices 166, 186 may constitute machine readable media. Further, the term "machine readable medium" may include a single medium or multiple media (e.g., a centralized or distributed database, and/or associated caches and servers) that are configured to store the one or more instructions 166, 186.

The term "machine readable medium" may include any medium that is capable of storing, encoding, or carrying instructions for execution by the processor 170 and that cause the processor 170 to perform any one or more of the techniques of the present disclosure, or that is capable of storing, encoding, or carrying data structures used by or associated with such instructions. Non-limiting machine readable medium examples may include solid-state memories and optical and magnetic media. In an example, a massed machine readable medium comprises a machine readable medium with a plurality of particles having resting mass. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM (compact disk-read only memory) and DVD-ROM (digital video disk-read only memory) disks.

The instructions 166, 186, and other messages, e.g., display data 140 and IP packets 142 may further be transmitted or received over wireless connection 120 utilizing various types of wireless protocols, such as mobile telephone networks (e.g., channel access methods including Code Division Multiple Access (CDMA), Time-division multiple access (TDMA), Frequency-division multiple access (FDMA), Orthogonal Frequency Division Multiplexing (OFDM), including Orthogonal Frequency Division Multiple Access (OFDMA), and cellular networks such as Global System for Mobile Communications (GSM), Universal Mobile Telecommunications System (UNITS), CDMA 2000 1x* standards and Long Term Evolution (LTE)), Plain Old Telephone (POTS) networks, and wireless data networks (e.g., IEEE 802 family of standards including IEEE 802.11 standards (Wi-Fit), IEEE 802.16 standards (WiMax®) and others), peer-to-peer (P2P) networks, or other protocols now known or later developed.

Figure 2:
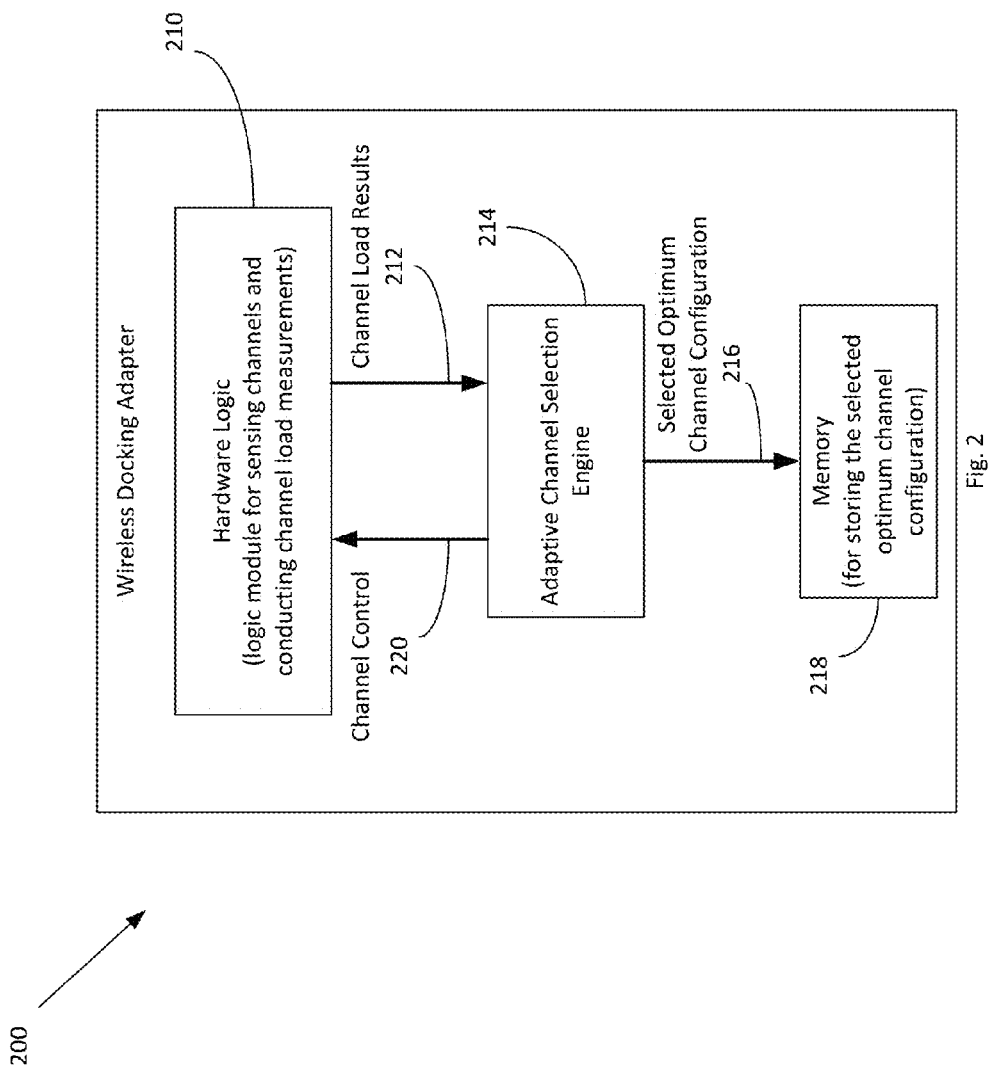
FIG. 2 is a block diagram of adaptive channel selection by a wireless docking adapter for measuring channel loads in idle time, according to an embodiment.

FIG. 2 is a block diagram of adaptive channel selection by a wireless docking adapter 200 for measuring channel loads in idle time, according to an embodiment. Hardware logic 210 senses channels and conducts channel load measurements. The channel load measurements 212 are provided to an ACS engine 214. The ACS engine 214 resides in the wireless docking adapter 200 since the wireless docking adapter 200 is AC (alternating current) powered during idle/disconnect mode. The ACS engine 214 periodically monitors the channel load for various channel configurations based on the channel load measurements and selects the optimum channel configuration 216. The selected optimum channel configuration 216 is stored in memory 218 according to a (predetermined schedule (e.g., every X minutes). After a docking computing device initiates a wireless connection with the wireless docking adapter 200, the wireless docking adapter 200 uses the stored optimum channel configuration 216 as a current channel for the wireless docking connection. The ACS engine 214 provides channel control information 220 to the hardware logic 210 to set up wireless radio channels according to a predetermined mode. Accordingly, the ACS engine 214 intelligently distributes the wireless docking traffic and maximizes efficient use of available channel capacity.

Figure 3:
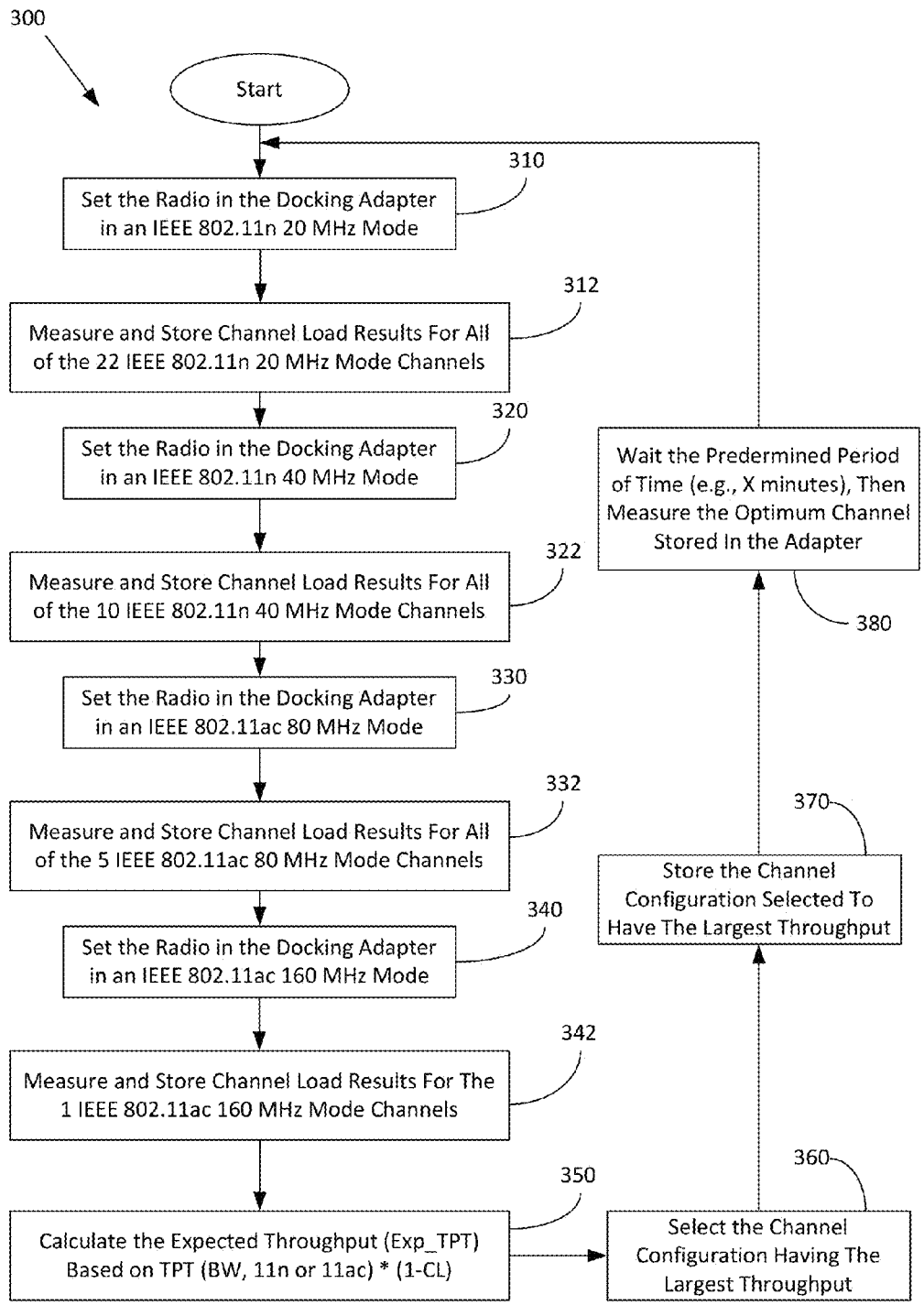
FIG. 3 is a flowchart of an adaptive channel selection method, according to an embodiment.

FIG. 3 is a flowchart of operations for adaptive channel selection 300, according to an embodiment. The ACS engine first sets the radio through a channel control link according to the IEEE 802.11n 20 MHz channel mode 310, and then measures and stores 22 channel load results ($C_1$, $C_2$, ..., $C_{22}$) for 20 MHz channels in the 5 GHz band 312. Then, the ACS engine sets the radio according to the IEEE 802.11n wide channel mode 320, and measures and saves the 10 channel load results ($C_1^{40\ MHz}$, $C_2^{40\ MHz}$, ..., $C_{10}^{40\ MHz}$), for 40 MHz channels 322. Next, the ACS engine sets the radio according to the IEEE 802.11ac mode 330, and measures and saves the channel load ($C_1^{80\ MHz}$, $C_2^{80\ MHz}$, ..., $C_5^{80\ MHz}$) for five IEEE 802.11ac 80 MHz channels 332. The ACS engine then sets the radio according to the IEEE 802.11ac mode 340, and measures and saves the one channel load ($C_1^{80\ MHz}$) for one IEEE 802.11ac 160 MHz channel 342. For each channel load measurement, the dedicated logic samples and measures the channel every predetermined period of time or according to a predetermined schedule. A counter is incremented when any of the following three events are triggered:

1) Energy larger than Clear Channel Assessment (CCA) threshold; or
2) It is a valid 802.11 packet; or
3) Network Allocation Vector (NAV) is non-zero.

Based on the measurements, the ACS engine calculates expected throughput 350 according to:

Expected Throughput (TPT)=TPT (bandwidth, 11n or 11ac)*(1-CL), $CL=C_1, C_2, \ldots, C_{22}; C_1^{40\ MHz}, C_2^{40\ MHz}, \ldots, C_{10}^{40\ MHz}; C_1^{80\ MHz}, C_2^{80\ MHz}, \ldots, C_5^{80\ MHz}; C_1^{160\ MHz}.$ The ACS engine selects the determined optimum Wi-Fi® configuration and channel with the highest expected throughput. TPT (bandwidth, 11n or 11ac) is the maximum throughput having a defined Wi-Fi® configuration. The ACS engine takes the high spectrum efficiency of the IEEE 802.11ac mode into account, e.g., for example, TPT (11ac) is 45% higher than TPT (11n), and puts more weight on the IEEE 802.11 ac mode. If the channel load of the IEEE 802.11ac mode is significantly heavier than the channel load for IEEE 802.11n mode using the 40 MHz channel, it is possible to select the IEEE 802.11n channel as the optimum wireless configuration. For example, the IEEE 802.11ac node uses a 160 MHz channel by bonding eight 20 MHz channels together. If one of the 20 MHz channels is currently filled with low Modulation and Coding Schemes (MCS) rate traffic and heavy co-channel traffic, for instance, the channel load will be large (i.e., 90%). According to the IEEE 802.11ac mod, the expected throughput for the channel is:

(1-90%)*1.7 Gbps*50%=85 Mbps (assuming 50% MAC efficiency).

If the IEEE 802.1 in 40 MHz channel is used, the expected throughput is:

(1-0%)*300 Mbps*50%=150 Mbps.

The ACS engine adaptively selects the best channel 360. The best channel is stored in the docking adapter 370 and updated every X minutes (i.e., according to the predetermined tune period 380).

When a computing device authorizes the wireless docking connection to such a docking adapter, the docking adapter selects the latest optimum channel stored in the Wireless Display (WiDi) adapter. Thus, the docking adapter avoids using the channel occupied by the low MCS rate (longer transmission time) and large traffic load. The ACS engine intelligently distributes the wireless docking traffic and efficiently utilizes the available channel capacity.

FIGS. 4*a-b* illustrate two examples 400 of a DUT with co-channel interference based on average power. The Adaptive Channel Selection described above with respect to FIGS. 1-3 is more accurate than the selection of a channel based on the average energy. In FIG. 4*a*, the co-channel interference 410 fir channel A 412 is close to the DUT 420, and the average energy is −50 dBm due to the low duty cycle 422. FIG. 4*a* also shows the CCA threshold 430.

In FIG. 4*b*, the co-channel interference 460 for channel B 462 is far away from the DUT 470, and the average energy is −60 dB. FIG. 4*b* also shows the CCA threshold 480. If channel selection is based on least amount of energy, channel B 462 will be selected. As long as the energy of the co-channel interferences 410, 460 is larger than the CCA thresholds 430, 480, Wi-Fi® in the DUTs 420, 470 holds the transmission and achievable throughput is impacted. Thus, channel B 462 is actually worse than channel A 412.

If the channel load is measured and an estimate of throughput is derived based on the channel load measurements, as described above with reference to FIGS. 1-3, the best channel may be selected. The ACS method described above, with reference to FIGS. 1-3, includes dedicated hardware to periodically measure the channel load and calculate the expected throughput when the docking adapter is idle. This method is accurate but takes time to measure the load for all the wireless channels.

Figure 5:
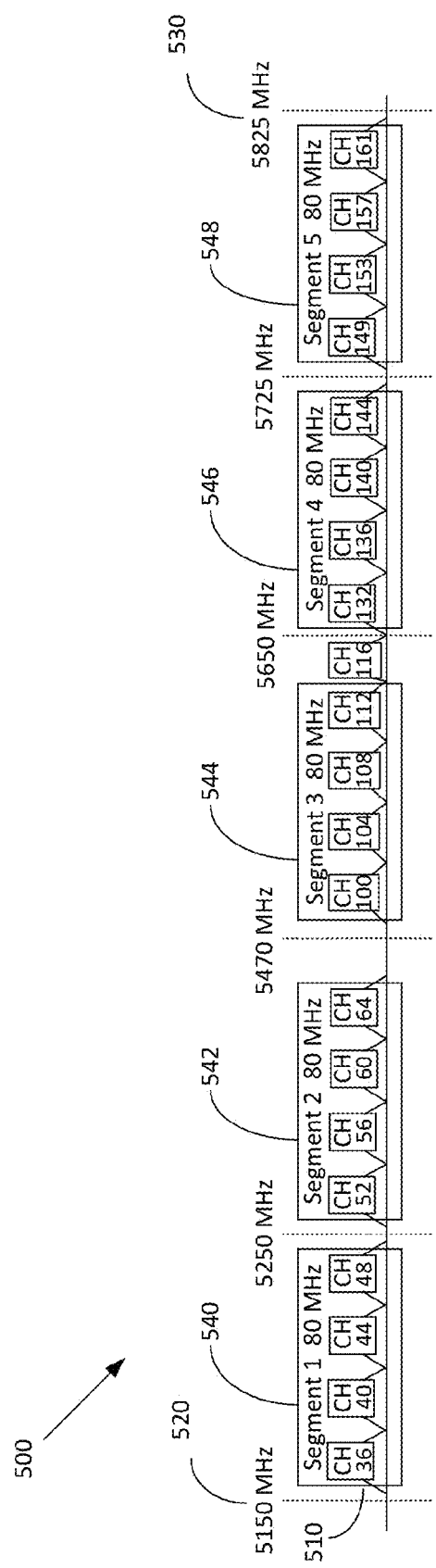
FIG. 5 is a diagram showing the five 80 MHz channels according to the IEEE 802.11 ac standard.

FIG. 5 is a diagram 500 showing the five 80 MHz segment according to the IEEE 802.11ac standard. In some network definitions, the available channels may be grouped into segments, and the selected channels in each segment may be indicated separately. The selected channels may have any pre-determined width, such as 20 MHz, 40 MHz, or other width. In FIG. 5, segments are arranged on the 5 GHz band, starting at 5.15 GHz and ranging through to 5.825 GHz, depending on the regulatory body for the country. For an 80 MHz segment according to the IEEE 802.11ac standard, four 20 MHz channels may be grouped to form one 80 MHz segment. The available channels 510 in the United States are channels 36, 40, 44, 48, 52, 56, 60, 64, 149, 153, 157, and 161 and range from 5150 MHz 520 to 5825 MHz 530, with each having a bandwidth of 20 MHz. Thus, the first 80 MHz segment according the IEEE 802.11ac standard, i.e., Segment 1 540, corresponds to IEEE 802.11a Channels 36, 40, 44 and 48. Segment 2 542 corresponds to IEEE 802.11a Channels 52, 56, 60 and 64; Segment 3 544 corresponds to IEEE 802.11a Channel 100, 104, 108 and 112; and Segment 4 546 corresponds to IEEE 802.11a Channel 132, 136, 140 and 144. Channel 116 is disposed between Segment 3 and Channel 4. Segment 5 548 corresponds to IEEE 802.11a Channel 149, 153, 157 and 161.

FIG. 6 illustrates a system diagram 600 for Adaptive Channel Selection, according to another embodiment. In FIG. 6, docking adapters 630, 632, 634 exchange docking channel information. According to system diagram 600, docking adapters 630, 632, 634 include memory to store the channel maps 640, 642, 644 that indicate what channels are available for possible use, and remove/add channels to the channel maps 640, 642, 644 that are used/released by neighboring docking adapter systems. For instance, a computing device A 650 requesting a wireless docking session initiates a wireless docking request by sending request to dock (RTD) packet 652.

Docking Adapter A 630 receives the RID packet associated with the wireless docking request, e.g., at the ACS engine (see FIG. 1, 175 and FIG. 214), from the computing device requesting a wireless docking session. Docking Adapter A 630 identifies the stored optimum wireless configuration and channel and transmits a clear to dock (CTD) packet 654 to set up a wireless docking session with the computing device, i.e., Computing Device A 650. The CTD packet 654 also includes the channel number, i.e., Channel 1 80 MHz, to use for its docking. The CTD packet 654 may be a multicast packet and will therefore be decoded by the docking adapters 630, 632, 634. Once Docking Adapter B 632 and Docking Adapter C 634 receive the CTD packet 654 indicating that 80 MHz Channel 1 is used for existing docking, Docking Adapters BC 632, 634 remove this channel from their channel maps 642, 644, as represented by the "X" in the channel maps 642, 644. Next, time when computing device B 660 initiates a docking request by sending RTD packet 662, Docking Adapter B 642 replies to the request by sending CTD packet 664. The CTD packet 664 also includes the channel number, i.e., Channel 5 80 MHz, to use for docking In this case, Docking Adapter B 632 selects the available channel (Chan5_80 MHz), which is the furthest away from the channel that is used for existing docking, i.e., Docking Adapter A 630, to avoid possible interference.

Once Docking Adapter A 630 and Docking Adapter C 634 receive the CTD packet 664 from Docking Adapter B 632 indicating that Channel 5 is used for docking, Docking Adapter A 630 and Docking Adapter C 634 remove this channel from their channel map 640, 644. Moreover, when the computing device A 650 wants to terminate the docking session, Docking Adapter A 630 sends out a request to end dock (RTED) packet 656. Then, Docking Adapter A 630 replies to the request from computing device A 650 by transmitting a clear to end d dock (CTED) packet 658 to indicate termination of the session for wireless docking. The CTED packet 658 includes the channel number used for its docking, i.e., Channel 1 in this example. The CTED packet 658 may be a multicast packet so that the docking adapters may decode it.

Once Docking Adapter B 632 and Docking Adapter C 634 receive the CTED packet 658 indicating that Channel 1 is released by Docking Adapter A 630 and is available again, Docking Adapter B 632 and Docking Adapter C 634 add this channel back to their channel maps 642, 644. The information of channel maps 640, 642, 644 may be exchanged using a predetermined information channel 690. For example, docking adapters may use channel 116 in the 5 GHz band. It is also possible to use any specific channel in the 2.4 GHz band.

In addition, the Adaptive Channel Selections methods described above may also be used together to reduce the channel load measurements for 80 MHz and 160 MHz IEEE 802.11ac configurations, which saves the processing power and time.

In the U.S., according to the e Federal Communications Commission (FCC), devices operating on 5.250-5.350 GHz and 5.47-5.725 GHz may employ dynamic frequency selection (DFS) to scan for and select the least-congested available channel so that the spectrum is better shared. Therefore, for 80 MHz channels according to the IEEE 802.11a standard, 3 out of 5 channels e.g., $C_2^{80\ MHz}$, $C_3^{80\ MHz}$, $C_4^{80\ MHz}$, may be used to support DFS. For 40 MHz channels in the 5 GHz band, 6 out of 10 channels may be used to support DFS. In addition, for 20 MHz channels in 5G band, 13 out of 22 channels may be used to support DFS.

FIGS. 7a-b illustrate an adaptive channel switch during an existing dock session based on available docking channel information 700, according to an embodiment. In FIG. 7a, docking adapters 730, 732, 734 exchange docking channel information with other docking adapters. In addition, docking adapters 730, 732, 734 know which channel is less crowded and may support higher throughput. DFS capability may thus be used to switch to other channels during the existing dock session.

In FIGS. 7a-b, channels in 5G band have multiple users (assuming they use 80 MHz channel for simplicity). Only channel utilization by computing device A 750, B 760 and C 780 are illustrated. In FIG. 7a, computing d A 750 is docked using channel 1 741, $C_1^{80\ MHz}$. Docking Adapters B 732 and C 734 are sent notifications 702 that channel 1 741 is no longer available. Docking Adapters B 732 and C 734 update their channel maps 742, 744 to show channel 1 is unavailable 743, 745.

Computing device B 760 requests docking using channel 5 746, $C_5^{80\ MHz}$. Computing Device B 760 initiates the docking request by sending RID packet 762 to Docking Adapter B 732. Docking Adapter B 732 replies to the request by sending CTD packet 764. Docking Adapter B 732 sends a notification 704 to Docking Adapters A 730 and C 734 that channel 5 746 is no longer available. Docking Adapters A 730 and C 734 update their channel maps 740, 744 to show channel 5 is unavailable 747, 748.

Computing device C 780 requests docking using channel 3 770, $C_3^{80\ MHz}$. Docking Adapter C 734 sends a notification 706 to Docking Adapters A 730 and B 732 that channel 3 770 is no longer available, Docking Adapters A 730 and B 732 update their channel maps 740, 742 to show channel 3 is unavailable 772, 774.

Next, in FIG. 7b, Docking Adapter A 730 detects that channel 4 790, $C_4^{80\ MHz}$, has become less busy and has a higher expected throughput. For example, other users that were docked using channel 4 790 completed their docking sessions so that channel 4 790 is free. Docking Adapter A 730 then switches 791 to channel 4 790 during its existing docking session using DFS capability as reflected by channel map 740, Docking Adapters B 732 and C 734 are notified of the change and update their channel maps 742, 744 accordingly so the use of channel 1 743, 745 by Docking Adapter A 730 is cleared in the channel maps 742, 744 of Docking Adapter B 732 and C 734, and channel 4 792, 794 in channel lap 742, 744 of Docking Adapter B 732 and C 734 is updated to show that channel 4 792, 794 is now being used by Docking Adapter A 730.

The channel load scan described above with reference to FIGS. 1-3 may be used to identify the less busy channel for adaptive channel switch. Since the connected wireless docking adapter is busy handling the docking data communication and is challenged to allocate extra time for channel load scan, an idle wireless docking adapter 796 in the neighborhood may be used for channel load scan and to identify the optimum channel. Different methods (e.g., received signal strength indicator (RSSI), audio based proximity sensor, etc.), may be used to recognize if the idle docking adapter is in the neighborhood. RSSI is a measurement of the power present in a received radio signal. The least crowded channel measured by the idle wireless docking adapter 796 is valid fir the docking adapter systems icy the proximity range. Channel map information may be exchanged among docking adapters using the information channel 798, which may be one specific channel in the GHz band or any specific channel in the 2.4 GHz band. Embodiments coordinate the docking adapter systems in a dense environment and enhance the performance by distributing the wireless docking traffic evenly and efficiently utilizing the available channel capacity. Embodiments may be used in WiDi products to enhance WiDi docking solution used in dens (i.e., office) environments. Wireless docking is therefore more robust against co-channel and adjacent channel interference.

The above detailed description includes references to the accompanying drawings, which form a part of the detailed description. The drawings show, by way of illustration, specific embodiments that may be practiced.

These embodiments are also referred to herein as "examples." Such examples can include elements in addition to those shown or described. Moreover, also contemplated are examples using any combination or permutation of those elements shown or described (or one or more aspects thereof), either with respect to a particular example (or one or more aspects thereof), or with respect to other examples or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are deemed to fall within the scope of that claim. Moreover, in the following claims, the terms "first," "second," "third," and so forth are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that claims recite the disclosed features. Rather, embodiments may include less than the features of those disclosed in a particular example. Thus, the following claims are hereby incorporated into the Detailed Description, with each claim standing on its own as a separate embodiment. The scope of the embodiments disclosed herein should be determined with reference to the appended claims, along with the full scope of equivalents to which such claims are entitled.

What is claimed is:

1. An Adaptive Docking Adapter (ADA), comprising:
a processor for identifying channels among a plurality of different predefined wireless channel standards, each predefined wireless channel standard defining a set of channels and a corresponding set of wireless configuration parameters including channel bandwidth, modulation scheme, and physical data rate, the processor for further performing load measurements of wireless channels to calculate an available bandwidth per available channel;
memory for storing a channel map and for storing a selected channel from among the channels identified by the processor having a determined highest expected throughput; and
an Adaptive Channel Selection (ACS) engine for switching modes among a plurality of wireless configuration modes corresponding to the plurality of different predefined wireless channel standards to determine an optimum wireless configuration mode corresponding to a wireless channel having a highest expected throughput according to the load measurements and the wireless configuration parameters for that channel, the ACS using, when a docking request is received wirelessly from a computing device, the determined optimum wireless configuration and channel having the highest expected throughput as a current channel for wireless docking to the computing device to wirelessly transmit data from input devices for controlling the computing device and to wirelessly receive video display data for display on a monitor;
the processor being further configured to access channel map information obtained by at least one other neighboring ADA via an information channel while performing wireless docking with the computing device.

2. The ADA of claim 1, wherein the channel map is used to provide an indication of a status of channels for possible use in achieving wireless docking upon receipt of a wireless docking request.

3. The ADA of claim 1, wherein the memory includes docking channel information associated with other adaptive docking adapters.

4. The ADA of claim 1, wherein the ACS engine provides channel control information to the processor to setup wireless radio channels according to a predetermined mode.

5. The ADA of claim 1, wherein the ACS engine switches to a second channel when the ACS engine determines, using Dynamic Frequency Selection (DFS), that a second channel has a higher expected throughput than the current channel.

6. The ADA of claim 1, wherein the ACS engine analyzes the channel map to identify available wireless channels for a docking session and, based on the determination of the optimum wireless configuration and the wireless channel having a highest expected throughput, maximizes efficient use of available channel capacity indicated in the channel map by distributing wireless docking traffic.

7. The ADA of claim 1, wherein the ACS engine receives a Request To Dock (RTD) packet from a computing device requesting a wireless docking session, the ACS engine identifying the optimum wireless configuration and channel having the highest expected throughput and transmitting a Clear To Dock (CTD) packet to set up a wireless docking session with the requesting computing device.

8. The ADA of claim 7, wherein the ACS engine receives a Request To End Dock (RTED) packet to requesting termination of the wireless docking session by the computing device, the ACS engine transmitting a Clear To End Dock (CTED) packet to indicate termination of the wireless docking session.

9. The ADA of claim 1, wherein the ACS engine monitors all available wireless channels by measuring a channel load of each IEEE 802.11n channel and a channel load of each IEEE 802.11ac channel.

10. The ADA of claim 9, wherein the ACS engine measures channel load of each IEEE 802.11n channel by measuring a channel load for 20 MHz channels and for 40 MHz channels, and the ACS engine measures channel load of each IEEE 802.11ac channel by measuring a channel load for 80 MHz channels and for 160 MHz channels.

11. The ADA of claim 1, wherein the wireless channels include wireless channels utilizing a protocol selected from a group consisting of Code Division Multiple Access (CDMA), Time-division multiple access (TDMA), Frequency-division multiple access (FDMA), and Orthogonal Frequency Division Multiplexing (OFDM), and utilizing one or more antennas.

12. The ADA of claim 1, wherein the ACS engine stores the determined optimum wireless configuration and a wireless channel having a highest expected throughput in memory according to a predetermined schedule.

13. The ADA of claim 1, wherein the ACS engine broadcasts to other adaptive docking adapters in range according to a predetermined schedule the optimum wireless configuration and channel used for a docking session for wireless docking, decodes broadcast packets received from other adaptive docking adapters, identifies a station identifier (ID) and a channel number for use in establishing a docking session, counts and add the number of docking pairs, differentiated by station IDs, used in each channel, and updates the channel map according to a predetermined schedule.

14. The ADA of claim 1, wherein a number of docking pairs, differentiated by station IDs, used in each channel is counted and reduced, the channel map being updated in response to the number of docking pairs used in each channel being counted and reduced.

15. A method performed by an Adaptive Docking Adaptor (ADA) for providing adaptive channel selection for wireless docking, comprising:

identifying available wireless channels among a plurality of different predefined wireless channel standards, each predefined wireless channel standard defining a set of channels and a corresponding set of wireless configuration parameters including channel bandwidth, modulation scheme, and physical data rate;

performing channel load measurements to calculate an available bandwidth per channel;

switching modes among a plurality of wireless configuration modes corresponding to the plurality of different predefined wireless channel standards to determine a channel having a highest expected throughput according to the load measurements and the wireless configuration parameters for that channel and, in response, determining an optimum wireless configuration mode based on the channel load measurements; and when a docking request is received, setting up a wireless docking session using the determined optimum wireless configuration mode and channel having the highest expected throughput; and accessing channel map information obtained by at least one other neighboring ADA via an information channel while performing wireless docking with a computing device.

16. The method of claim 15, wherein the monitoring all available wireless channels further comprises measuring a channel load of each IEEE 802.11n channel and a channel load of each IEEE 802.11ac channel by measuring a channel load for 20 MHz channels and for 40 MHz channels, and the ACS engine measures channel load of each IEEE 802.11ac channel by measuring a channel load for 80 MHz channels and for 160 MHz channels.

17. The method of claim 15 further comprising maintaining a channel map in memory to provide an indication of a status of channels for possible use in achieving wireless docking upon receipt of a wireless docking request, the channel map including docking channel information associated with other adaptive docking adapters.

18. The method of claim 15 further comprises broadcasting to other adaptive docking adapters in range, according to a predetermined schedule, the optimum wireless configuration and channel used for a docking session for wireless docking, decoding broadcast packets received from other adaptive docking adapters, identifying a station ID and a channel number for use in establishing a docking session, counting and adding the number of docking pairs, differentiated by station IDs, used in each channel, and updating, according to a predetermined schedule, a channel map for identifying information regarding wireless channels.

19. The method of claim 15, wherein the setting up a wireless docking session further comprises setting up a wireless channel using a protocol selected from a group consisting of Code Division Multiple Access (CDMA), Time-division multiple access (TDMA), Frequency-division multiple access (FDMA), and Orthogonal Frequency Division Multiplexing (OFDM), and utilizing one or more antennas.

20. At least one non-transitory machine readable medium comprising instructions that, when executed by the machine, cause the machine to perform operations for adaptive channel selection for wireless docking, the operations comprising:

identifying available wireless channels among a plurality of different predefined wireless channel standards, each predefined wireless channel standard defining a set of channels and a corresponding set of wireless configuration parameters including channel bandwidth, modulation scheme, and physical data rate;

performing channel load measurements to calculate an available bandwidth per channel;

switching modes among a plurality of wireless configuration modes corresponding to the plurality of different predefined wireless channel standards to determine a channel having a highest expected throughput according to the load measurements and the wireless configuration parameters for that channel and, in response, determining an optimum wireless configuration mode based on the channel load measurements;

when a docking request is received, setting up a wireless docking session using the determined optimum wireless configuration mode and channel having the highest expected throughput;

accessing channel map information obtained by at least one other neighboring adaptive docking adaptor (ADA) via an information channel while performing wireless docking with a computing device.

21. The at least one non-transitory machine readable medium of claim 20, wherein the monitoring all available wireless channels further comprises measuring a channel load of each IEEE 802.11n channel and a channel load of each IEEE 802.11ac channel by measuring a channel load for 20 MHz channels and for 40 MHz channels, and the ACS engine measures channel load of each IEEE 802.11ac channel by measuring a channel load for 80 MHz channels and for 160 MHz channels.

22. The at least one non-transitory machine readable medium of claim 21 further comprising maintaining a channel map in memory to provide an indication of a status of channels for possible use in achieving wireless docking upon receipt of a wireless docking request, the channel map including docking channel information associated with other adaptive docking adapters.

23. The at least one non-transitory machine readable medium of claim 21 further comprises broadcasting to other adaptive docking adapters in range, according to a predetermined schedule, the optimum wireless configuration and channel used for a docking session for wireless docking, decoding broadcast packets received from other adaptive docking adapters, identifying a station ID and a channel number for use in establishing a docking session, counting and adding the number of docking pairs, differentiated by station IDs, used in each channel, and updating, according to a predetermined schedule, a channel map for identifying information regarding wireless channels.

24. The at least one non-transitory machine readable medium of claim 21, wherein the setting up a wireless docking session further comprises setting up a wireless channel using a protocol selected from a group consisting of Code Division Multiple Access (CDMA), Time-division multiple access (TDMA), Frequency-division multiple access (FDMA), and Orthogonal Frequency Division Multiplexing (OFDM), and utilizing one or more antennas.

* * * * *